(No Model.)
G. E. DESMOND.
TREE FELLING SAW.
No. 471,810. Patented Mar. 29, 1892.
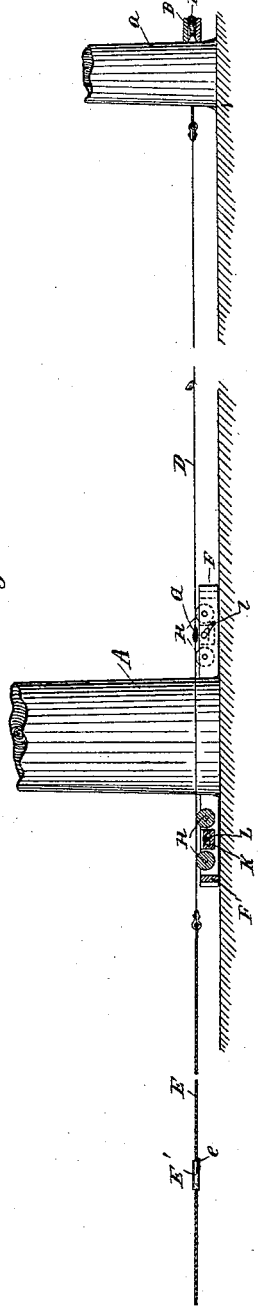
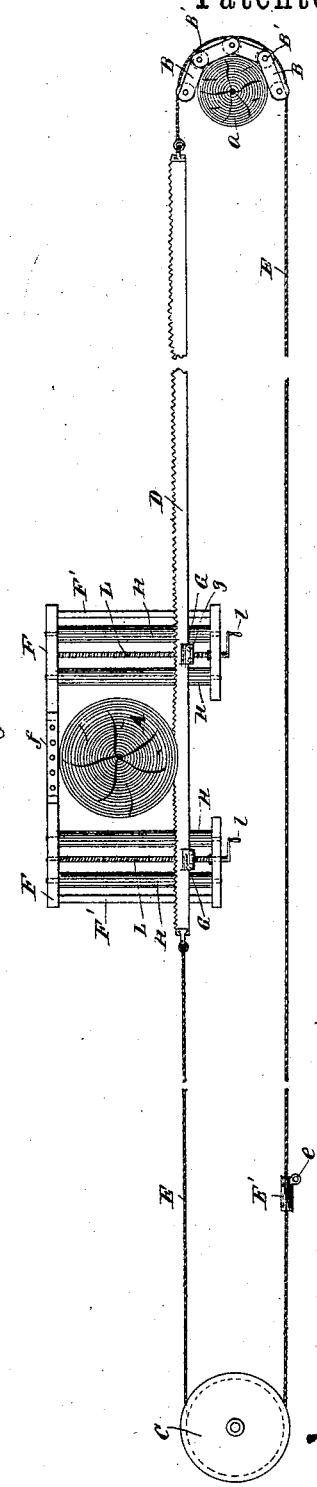
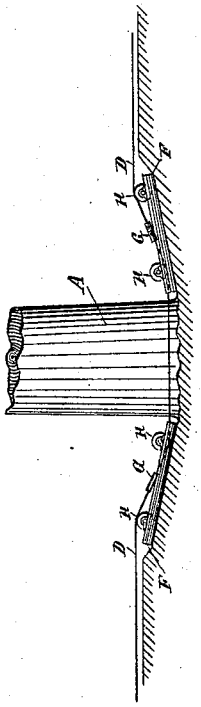
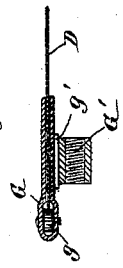
Witnesses.
A. H. Opsahl
E. F. Elmore
Inventor.
George E. Desmond
By his Attorney.
Jas. P. Williamson

UNITED STATES PATENT OFFICE.

GEORGE E. DESMOND, OF BRULE, WISCONSIN.

TREE-FELLING SAW.

SPECIFICATION forming part of Letters Patent No. 471,810, dated March 29, 1892.

Application filed June 8, 1891. Serial No. 395,497. (No model.)

*To all whom it may concern:*

Be it known that I, GEORGE E. DESMOND, a citizen of the United States, residing at Brule, in the county of Douglas and State of Wisconsin, have invented certain new and useful Improvements in Tree-Felling Saws; and I do hereby declare the following to be a full, clear, and exact description of the invention, such as will enable others skilled in the art to which it appertains to make and use the same.

My invention has for its object to provide an efficient device for sawing and felling trees. To this end I employ the mechanism illustrated in the accompanying drawings, wherein like letters refer to like parts throughout.

Figure 1 is a side elevation showing the device in working position, some parts being shown in section. Fig. 2 is a plan view of the same. Fig. 3 is a side elevation of a modification of the device, and Fig. 4 is a cross-section of the saw and one of the saw-blade guides.

A represents a tree to be felled.

*a* represents a distant tree or other support for the driving-cable.

B B' is a cable-guide applicable to the tree *a* or other support, of which the part B is a jointed frame, and the parts B' are a series of rollers held therein.

C is a loose pulley secured in working position to any suitable support and co-operates with the cable-guide B B' to hold the cable and direct the action of the saw.

D is the saw.

E is the cable passing over the cable-guide and the pulley and having its ends attached to the ends of the saw.

E' is a driving-lug secured to the cable and having an eye *e* or other device for application of animal-power.

The device for guiding and holding the saw to its work at the proper point on the tree comprises a jointed back sill F F, adjustably secured together by strap-irons and bolts, as shown at *f*, a pair of wings F' F', secured to the two sections of the sill, two sets of guide-rollers H, secured one set on each of the said wings, a pair of saw-blade clamps or holders G, each of which is provided with an anti-friction-roller *g*, bearing against the back of the saw, and is provided with a depending dovetail lug *g'*, having a screw-threaded nut G', the dovetail lug constituting a slide, which works in the corresponding dovetail guideway K, one of which is fixed to each of the wings, and clamping - screws L, working through the nuts H and fixed against lengthwise movement in the frame, each screw being provided with a crank - handle *l*. This frame is adapted to straddle the tree and is securable in position by anchor-stakes or in any other suitable way. The saw is then placed in the clamps and the cable passed around the cable-guide and the pulley and the horse or other animal attached to the driving - lug. The saw is reciprocated by changing the direction of the horse. The saw is adjustable to its work by the action of the clamping-screws and the nut G' on the saw-blade clamps G.

With the modification shown in Fig. 3 trees may be sawed below the level of the surrounding ground by digging a hole around the tree and securing therein the frame in the position shown. This frame may either be of a special construction, or the frame shown in Figs. 1 and 2 may be made with a vertical pivotal adjustment. The saw in this modification is passed over the outer and under the inner guide-rollers. It is evident that this reciprocating motion of the saw might be produced by other than animal-power and that instead of a reciprocating saw a continuous band-saw might be employed and be driven in a constant direction.

What I claim, and desire to secure by Letters Patent of the United States, is as follows:

1. A device for felling trees and similar work, comprising a flexible saw and a frame having suitable feeding and guiding devices for holding and directing the saw to its work, the said guiding devices being so arranged as to direct the working portion of the saw to its work in a plane offset from the plane passing through the driving portions of the saw and parallel with the plane of the feed, whereby the tree may be sawed from its stump at a point below the surface of the ground.

2. The combination, with a frame having two or more parallel guide-rollers spaced apart from each other on each of the opposite sides of a central space adapted to inclose the tree, of a flexible saw passing over one of the outer rollers and under one of the inner rollers on each side of said central space or tree, whereby the tree may be sawed from its stump below the surface of the ground.

3. The combination, with the flexible saw, of the guide-frame having its parts which straddle the tree constructed so that they may stand at an angle dipping downward below the surface of the ground, and suitable guides for the saw located at the outer and inner ends of each of the said parts of the frame for directing the saw and holding it to its work below the surface of the ground, substantially as and for the purpose set forth.

In testimony whereof I affix my signature in presence of two witnesses.

GEORGE E. DESMOND.

Witnesses:
 FINLEY WHARTON,
 IRA H. COX.